United States Patent
Fujiwara et al.

(10) Patent No.: US 7,590,103 B2
(45) Date of Patent: Sep. 15, 2009

(54) ADAPTOR SERVING FOR BOTH MOBILE PHONE UNIT AND PRIVATE IP PHONE UNIT

(75) Inventors: Hidehiko Fujiwara, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 840 days.

(21) Appl. No.: 10/716,464

(22) Filed: Nov. 20, 2003

(65) Prior Publication Data
US 2004/0105404 A1    Jun. 3, 2004

(30) Foreign Application Priority Data
Nov. 28, 2002    (JP)    ............... 2002-345848

(51) Int. Cl.
*H04L 12/66* (2006.01)
*H04M 1/00* (2006.01)

(52) U.S. Cl. ...................... 370/352; 455/555

(58) Field of Classification Search ............ 455/557, 455/554.1, 555, 448, 554.2; 379/88.25, 198, 379/218.01, 355.01, 356.01; 370/271, 320, 370/352
See application file for complete search history.

(56) References Cited

U.S. PATENT DOCUMENTS

| | | | | |
|---|---|---|---|---|
| 5,490,212 A * | 2/1996 | Lautenschlager | ............ | 379/225 |
| 5,956,331 A * | 9/1999 | Rautiola et al. | ............ | 370/338 |
| 5,995,828 A * | 11/1999 | Nishida | ............ | 455/417 |
| 6,122,502 A * | 9/2000 | Grundvig et al. | ............ | 455/414.1 |
| 6,263,211 B1 * | 7/2001 | Brunner et al. | ............ | 455/464 |
| 6,549,534 B1 * | 4/2003 | Shaffer et al. | ............ | 370/355 |
| 6,571,108 B1 * | 5/2003 | Otsuka et al. | ............ | 455/433 |
| 6,577,631 B1 * | 6/2003 | Keenan et al. | ............ | 370/394 |
| 6,829,477 B1 * | 12/2004 | Lu et al. | ............ | 455/426.1 |
| 6,920,318 B2 * | 7/2005 | Brooking et al. | ............ | 455/419 |
| 7,003,287 B2 * | 2/2006 | Roeder | ............ | 455/417 |
| 7,039,401 B2 * | 5/2006 | Eynard et al. | ............ | 455/433 |
| 7,120,135 B2 * | 10/2006 | Kim | ............ | 370/329 |
| 7,274,782 B2 * | 9/2007 | Forte | ............ | 379/201.01 |
| 2003/0076933 A1 * | 4/2003 | Ranalli et al. | ............ | 379/88.17 |

FOREIGN PATENT DOCUMENTS

EP    1032224 A2 *    8/2000

(Continued)

*Primary Examiner*—Kevin C Harper
*Assistant Examiner*—Xavier Wong
(74) *Attorney, Agent, or Firm*—Sughrue Mion, PLLC

(57) ABSTRACT

An adaptor serving for both a mobile phone unit and a private IP telephone unit is disclosed. A mobile phone unit is connected to the adaptor through a low power wireless system or a wired cable. A telephone unit controller manages resource data (data such as telephone directory, telephone history, and mail). A memory editor links a telephone directory of a mobile phone unit and a telephone directory of an IP-PBX in cooperation with a telephone directory controller of the IP-PBX. A VoIP extension line section provides the mobile phone unit with a function of an extension telephone unit in cooperation with the IP-PBX. A QoS controller is a circuit that performs control for minimizing loss of audio data due to communication congestion on a communication path (intranet/Internet). A charging circuit is a circuit that charges a battery of the mobile phone unit. The charging circuit contains a protecting circuit that protects the battery from being overcharged.

8 Claims, 3 Drawing Sheets

FOREIGN PATENT DOCUMENTS

| | | | |
|---|---|---|---|
| JP | 8275238 A | * | 10/1996 |
| JP | 8-331650 A | | 12/1996 |
| JP | 3045860 U | | 11/1997 |
| JP | 11-275617 A | | 10/1999 |
| JP | 2001-54151 | * | 2/2001 |
| JP | 2001285477 A | * | 10/2001 |
| JP | 2002111874 A | * | 4/2002 |
| JP | 2002-158796 A | | 5/2002 |
| WO | WO 00/70845 A1 | * | 11/2000 |

* cited by examiner

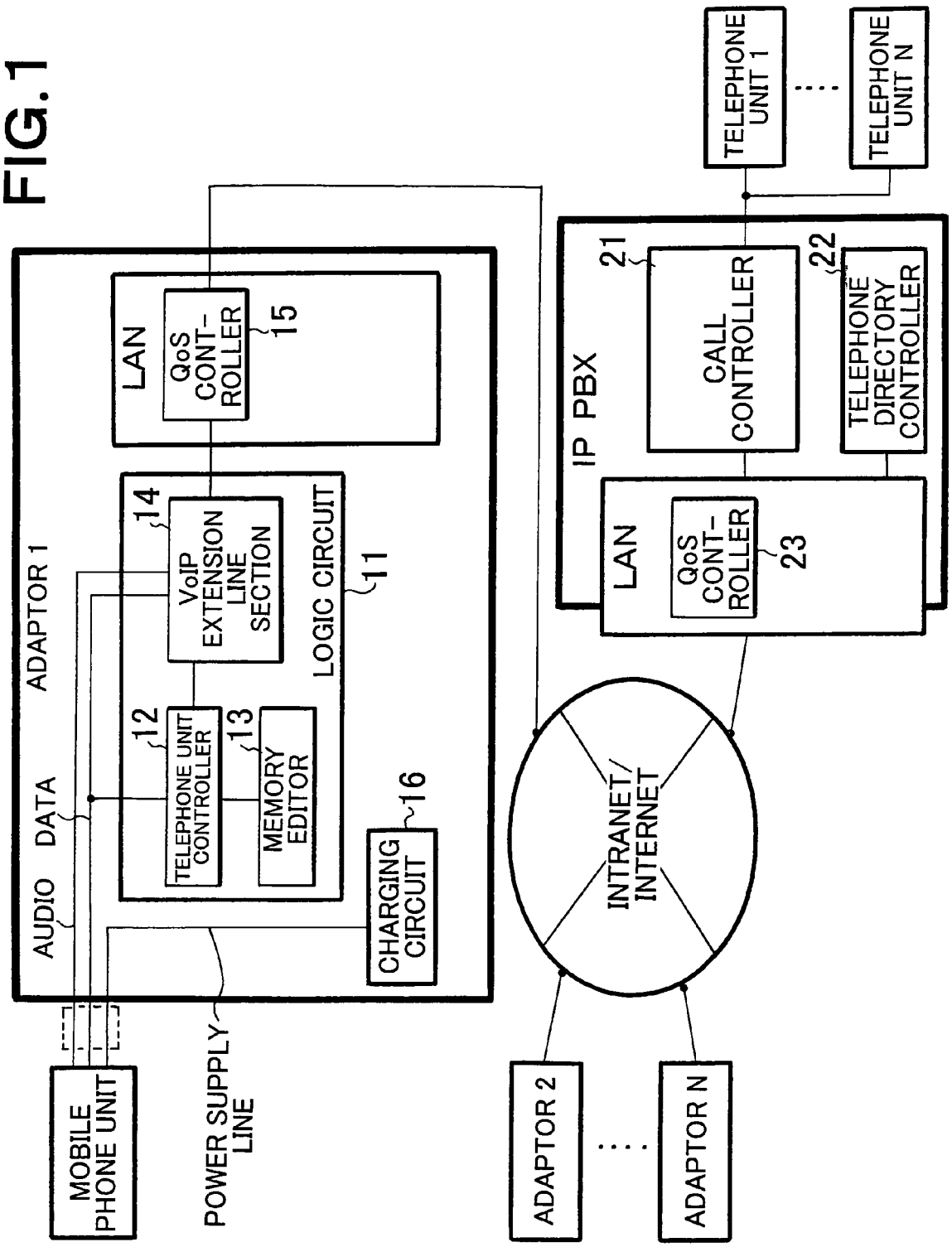

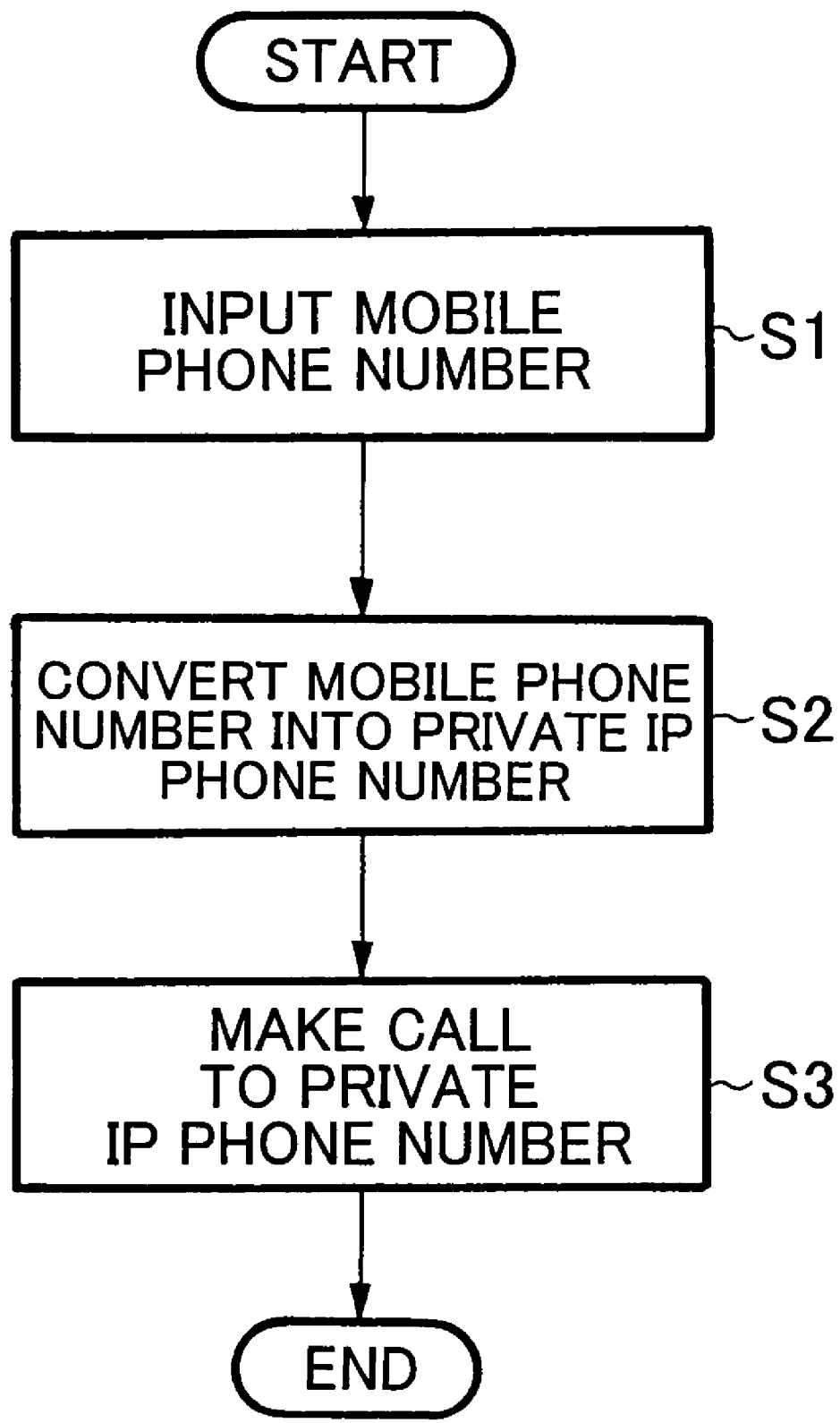

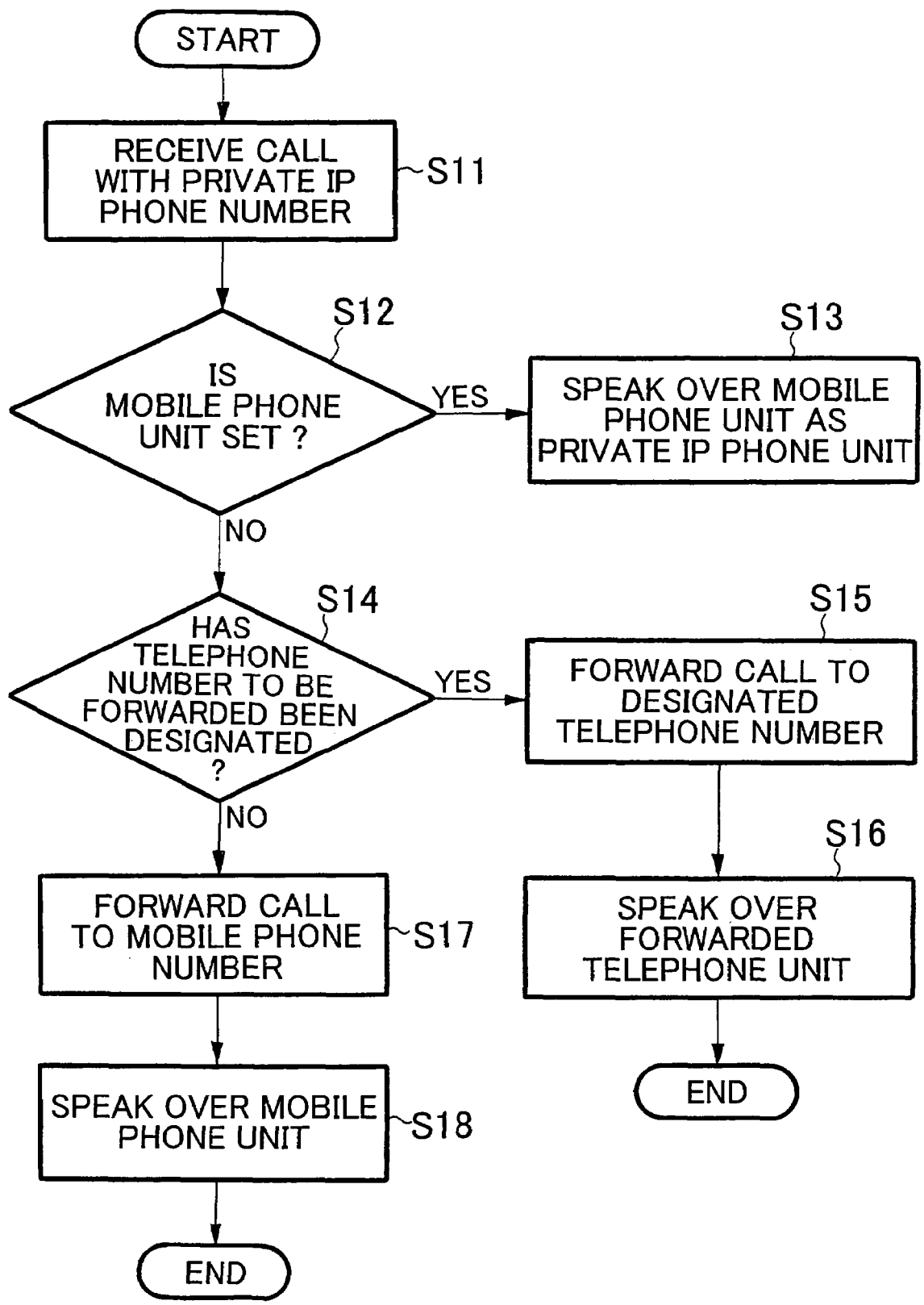

ADAPTOR SERVING FOR BOTH MOBILE PHONE UNIT AND PRIVATE IP PHONE UNIT

BACKGROUND OF THE INVENTION

1. Field of the Invention

The present invention relates to an adaptor serving for both a mobile phone unit and a private IP (Internet protocol) telephone of which the mobile phone unit can be used as the private IP telephone unit.

2. Description of the Related Art

In recent years, a private IP telephone unit that uses a LAN (local area network) as a private telephone network circuit, which spreads over premises, is known.

A sales person who mainly works in a suburb area often uses a mobile phone unit. When he or she goes back to his or her office, he or she uses a private IP telephone unit. In this case, since the telephone number of the mobile phone unit is different from the telephone number of the private IP telephone unit, when someone wants to urgently contact the sales person, the calling party should call him or her with the suitable telephone number of the mobile phone unit or the private telephone unit.

In addition, a technology of which a mobile phone unit has a function for an IP telephone has been disclosed (for example, refer to Related Art Reference 1).

RELATED ART REFERENCE 1

Japanese Utility Model Registration No. 3045860

Conventionally, such a sales person should have both a mobile phone unit and a private IP telephone unit. In addition, when he or she uses a mobile phone unit, he or she cannot use functions of a multi-functional telephone of the office. Since the telephone number of the mobile phone unit is different from the telephone number of the private IP telephone, namely, there are a plurality of telephone numbers, when someone needs to contact him or her, unless the calling party memorizes both the telephone numbers, he or she cannot contact the called party at once. In addition, there is a telephone directory for mobile phone units independent of a telephone directory for private IP telephone units.

In addition, if a calling party goes out and a called party is in a hot spot of a wireless LAN, when the calling party cells the called party, the calling party should pay a connection fee of the mobile phone unit. Moreover, when the called party leaves from the hot spot, the calling party cannot make a call to the called party over the private IP telephone network.

Since charging cradles for both a mobile phone unit and a private IP telephone unit are necessary, the desk space of the user becomes narrow. In addition, although a wired LAN connection can be used, a mobile phone unit is wirelessly connected to a mobile phone network. Thus, the battery life shortens.

SUMMARY OF THE INVENTION

Therefore, an object of the present invention is to provide an adaptor serving for both a mobile phone unit and a private IP telephone unit, of which the mobile phone unit can be used also as the private IP telephone unit.

To solve the foregoing problem, the present invention is an adaptor serving for both a mobile phone unit and a private IP telephone unit, which is connectable to the mobile phone unit through a low power wireless system or a wired cable and connected to an IP-PBX through an IP network, the adaptor comprising: a telephone unit controller for managing resource data of the mobile phone unit; and a VoIP (Voice over IP) extension section for providing the mobile phone unit with a function of a private IP telephone unit in cooperation with the IP-PBX, wherein when a call is made with the mobile phone unit, a telephone number of the called mobile phone unit which is input from the calling mobile phone unit is converted into a telephone number of a called private IP telephone unit and the call is made to the telephone number of the called private IP telephone unit, and wherein when a call is received to a telephone number of the private IP telephone unit, it is determined whether or not the mobile phone unit is connected to the adaptor and when connected, a telephone call is performed with the mobile phone unit.

With the foregoing structure, since a mobile phone unit and a private IP telephone unit are mediated, an IP network can be switched from and to a mobile phone network without user's awareness thereabout.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 1 is a schematic diagram showing a structure of a network using an adaptor serving for both a mobile phone unit and a private IP telephone unit according to the present invention;

FIG. 2 is a flow chart describing an operation in the case that a telephone call is made using the adaptor according to the present invention; and FIG. 3 is a flow chart describing an operation in the case that a telephone call is received using the adaptor according to the present invention.

DESCRIPTION OF PREFERRED EMBODIMENTS

Next, with reference to the accompanying drawings, an embodiment of the present invention will be described.

FIG. 1 shows a structure of a network using an adaptor serving for both a mobile phone unit and a private IP telephone unit according to the present invention. Adaptors 1 to N are connected to an IP-PBX through the Internet or an intranet. In other words, the adaptors 1 to N can be connected to the Internet or the intranet through a LAN (intranet) within a company, an access point of a provider, a hot spot of a wireless LAN, or the like. Thus, the adaptors 1 to N can be used as private IP telephone unit terminals within the company.

A mobile phone unit is connected to an adaptor through a low power wireless system or a wired cable. Telephone units 1 to N connected to the IP-PBX (Internet Protocol-Private Branch exchange) are conventional office telephone units used as extension telephone units (private IP telephone units) and public telephone units through the IP-PBX.

A logic circuit 11 of the adaptor comprises a telephone unit controller 12, a memory editor 13, and a VoIP (Voice over IP) extension line section 14. The telephone unit controller 12 manages resource data (data of telephone directory, telephone history, mail, and so forth). The memory editor 13 links a telephone directory of the mobile phone unit and a telephone directory of the IP-PBX in cooperation with a telephone directory controller 22 of the IP-PBX. The VoIP extension line section 14 provides the mobile phone unit with a function as an extension telephone unit in cooperation with the IP-PBX. A QoS (Quality of Service) controller 15 is a circuit that performs control for minimizing loss of audio data due to communication congestion of a communication path (intranet or Internet). A charging circuit 16 is a circuit that charges a battery of the mobile phone unit. The charging circuit 16 includes a protecting circuit that protects the battery from being overcharged.

A call controller 21 of the IP-PBX controls extension telephone units (private IP telephone units). A telephone directory controller 22 links the telephone directory of the IP-PBX and the telephone directory of the mobile phone unit in corporation with the memory editor 13 of the adaptor. A QoS controller 23 is a circuit that performs control for minimizing loss of audio data due to communication congestion of the communication path (intranet/Internet).

According to the present invention, an adaptor connected to a mobile phone unit can be used as a private IP telephone unit. Thus, the resources of the mobile phone unit used in a suburb area can be directly used for the private IP telephone unit. In this case, the resources include hardware resources such as a microphone and software resources such as a telephone directory. The software resources are linked with information of the private IP telephones by the memory editor of the adaptor.

Since the adaptor has a function for detecting characteristics of a network and automatically switching settings thereof, the adaptor can be placed anywhere as long as there is a network environment. In addition, the adaptor has a function for confirming that it is not connected to the mobile phone unit and forwarding a call addressed to the private IP telephone unit to the mobile phone unit.

When a sales person places the adaptor in his or her house, office, or hot spot, as long as he or she has a mobile phone unit, he or she can use it as a private IP telephone unit in a network environment or a normal mobile phone unit in non-network environment without his or her awareness thereabout. In this case, each member of the office can summarize all telephone numbers of other members of the office in extension numbers of the private IP telephone units assigned.

Next, with reference to flow charts of FIG. 2 and FIG. 3, operations of the adaptor according to the present invention in the case that a telephone call is made and a telephone call is received will be described.

Operation of the adaptor in the case that a telephone call is made:

The telephone unit controller 12 sends a telephone number of a mobile phone unit that is input therefrom (at step 1) to the VoIP extension line section 14. The VoIP extension line section 14 converts the telephone number of the mobile phone unit into a telephone number of a corresponding private IP telephone (at step 2). The private IP telephone unit originates a call to the converted telephone number (at step 3).

Operation of the adaptor in the case that a telephone call is received:

The VoIP extension line section 14 receives a call with a private IP telephone unit (at step 11). The telephone unit controller 12 determines whether or not a mobile phone unit is connected to the adapter (at step 12). When a mobile phone unit is connected to the adapter, with a microphone and a speaker of the mobile phone unit, a telephone call is performed as the private IP telephone unit (at step 13).

When a mobile phone unit is not connected to the adaptor, the VoIP extension line section 14 determines whether or not a telephone number to be forwarded has been designated (at step 14). When a telephone number to be forwarded has been designated, the VoIP extension line section 14 forwards the call to the telephone number to be forwarded (at step 15). A telephone call is performed with the forwarded telephone unit (at step 16). When a mobile phone unit is not connected to the adaptor and a telephone number to be forwarded has not been designated, the VoIP extension line section 14 forwards the call to a telephone number of a mobile phone unit (at step 17). A telephone call is performed with the mobile phone unit (at step 18).

As was described above, when the adaptor that is connected to a mobile phone unit and used as a private IP telephone unit is prepared, the following advantages will be obtained.

When an Internet environment (an LAN system within a company, an access point of a provider, or a hot spot service of a wireless LAN) and the adaptor are used, a mobile phone unit can be used as a private IP telephone unit.

In this case, the user can inexpensively use a private IP telephone unit at a hot spot in a suburb area without need to pay an expensive mobile phone connection charge.

Since the adaptor has a function for converting a telephone number of a private IP telephone unit into a telephone number of a mobile phone unit or vice versa, when the user memorizes only a telephone number of a private IP telephone unit of a called party, the user can call both telephone numbers of a private IP telephone unit and a mobile phone unit of the called party.

Since the adaptor has a function for linking the content of a memory of a private IP telephone unit and the content of a memory of a mobile phone unit, the user can use the telephone directory of the private IP telephone unit as the telephone directory of the mobile phone unit when he or she is out.

Since the adaptor has functions of a multi-functional telephone unit as a private IP telephone unit, the user can use the functions such as a forwarding function and a conference function of the multi-functional telephone unit with a mobile phone unit.

Since the adaptor has a call forwarding function, if a mobile phone unit is disconnected from the adaptor, an incoming call can be forwarded to a telephone number of a mobile phone unit or a registered telephone number.

Since the adaptor has a network characteristic detecting function, even if the adaptor is used in another network environment, the adaptor can be automatically connected to the network.

Since the adaptor can be connected through a low power wireless system or a wired cable, the user can use the adaptor in his or her desired scene.

As was described above, since the adaptor according to the present invention mediates a mobile phone unit and a private IP telephone unit, a connection can be switched between an IP network and a mobile phone network without user's awareness thereabout.

Since a telephone number of a mobile phone unit is automatically converted into a telephone number of a private IP telephone unit or vice versa, the user does not need to have both a mobile phone unit and a private IP telephone unit.

With a mobile phone unit, the user can use functions of a multi-functional telephone as a private IP telephone unit (call forwarding function, a telephone conference, and so forth).

When the user is absent in the office, since an incoming call addressed to his or her private IP telephone is automatically forwarded to him or her, all telephone numbers can be summarized in telephone numbers of private IP telephone units.

Since the content of a telephone directory of a mobile phone unit and the content of a telephone directory of a private IP telephone unit are linked, the two telephone directories of the mobile phone unit and the private IP telephone unit can be unified to one telephone directory.

Since the charging circuit controls charging of a battery of a mobile phone unit, a charging cradle dedicated therefor can be omitted. Thus, the desk space of the user can be effectively used.

Since a wired LAN connection can be used with the adaptor, it is not necessary to wirelessly connect a mobile phone unit to a mobile phone network. Thus, the battery life of the mobile phone unit becomes long.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An adaptor being connectable to a mobile phone unit through a low power wireless system or a wired cable and connected to an Internet Protocol—Private Branch eXchange (IP-PBX) through an Internet Protocol (IP) network, comprising:
    a telephone unit controller which manages resource data of the mobile phone unit;
    a Voice over IP (VoIP) extension section which converts a telephone number of the connected mobile phone unit, into a telephone number of a private IP telephone number corresponding to the input telephone number, and which calls a telephone number input into the connected mobile phone unit from the telephone number of the private IP telephone; and
    a memory editor which links a telephone directory of the mobile phone unit and a telephone directory stored on the IP-PBX.

2. The adaptor as set forth in claim 1, further comprising:
    a Quality of Service (QoS) controller for performing control for minimizing loss of audio data due to communication congestion over the IP network.

3. The adaptor as set forth in claim 1, further comprising:
    a charging circuit for charging a battery of the mobile phone unit.

4. An adaptor being connectable to a mobile phone unit through a low power wireless system or a wired cable and connected to an Internet Protocol—Private Branch eXchange (IP-PBX) through an Internet Protocol (IP) network, comprising:
    a telephone unit controller which determines whether the mobile phone unit is connected to the adaptor when a call to a telephone number of a private IP telephone is received;
    a Voice over IP (VoIP) extension section which operates the mobile phone unit as a private IP telephone unit if the mobile phone unit is determined to be connected to the adaptor when the call to the telephone number of the private IP telephone is received; and
    a memory editor which links a telephone directory of the mobile phone unit and a telephone directory stored on the IP-PBX.

5. The adaptor as set forth in claim 4,
    wherein if the mobile phone unit is determined not to be connected to the adaptor when the call is received to the telephone number of the private IP telephone, the VoIP extension section determines if a forwarding is designated,
    wherein if the forwarding telephone number is designated, the call is forwarded to the designated telephone number.

6. The adaptor as set forth in claim 5,
    wherein if the mobile phone unit is determined not to be connected to the adaptor and a forwarding telephone number is not designated, the call is forwarded to a telephone number of the mobile phone unit and a telephone call is performed with the mobile phone unit.

7. The adaptor as set forth in claim 4, further comprising:
    a Quality of Service (QoS) controller for performing control for minimizing loss of audio data due to communication congestion over the IP network.

8. The adaptor as set forth in claim 4, further comprising:
    a charging circuit for charging a battery of the mobile phone unit.

* * * * *